United States Patent [19]
Carson

[11] Patent Number: 5,134,723
[45] Date of Patent: Jul. 28, 1992

[54] RADIO SENSITIVITY ENHANCER

[76] Inventor: William E. Carson, 165 Canterbury Rd., Danville, Va. 24541

[21] Appl. No.: 511,738

[22] Filed: Apr. 20, 1990

[51] Int. Cl.⁵ .............................................. H04B 1/10
[52] U.S. Cl. .................................... 455/254; 455/306
[58] Field of Search ................ 455/254, 296, 302–306, 455/295

[56] References Cited

U.S. PATENT DOCUMENTS

| | | |
|---|---|---|
| 2,394,544 | 2/1946 | Gottier . |
| 2,450,818 | 10/1948 | Vermillion . |
| 3,070,747 | 12/1962 | Addlemen . |
| 3,147,440 | 9/1964 | Benton ............................... 455/295 |
| 3,628,155 | 12/1971 | Muzzi . |
| 3,949,309 | 4/1976 | Pecar .................................... 455/305 |
| 4,044,359 | 8/1977 | Applebaum et al. . |
| 4,063,039 | 12/1977 | Endres et al. . |
| 4,067,013 | 1/1978 | Smith . |
| 4,135,159 | 1/1979 | Kubanoff . |
| 4,181,892 | 1/1990 | Dilley .................................. 455/306 |
| 4,220,923 | 9/1980 | Pelchat et al. . |
| 4,243,955 | 1/1981 | Daniel et al. . |
| 4,313,220 | 1/1982 | Lo et al. . |
| 4,408,350 | 10/1983 | Donath . |
| 4,408,352 | 10/1983 | Dudding . |
| 4,434,508 | 2/1984 | Sommer . |
| 4,466,131 | 8/1984 | Ghose et al. . |
| 4,554,679 | 11/1985 | Schiff . |
| 4,878,251 | 10/1989 | Richardson ........................ 455/304 |

OTHER PUBLICATIONS

John Devoldere, *Low-Band DXing*, Chapter IV, pp. IV-1-IV-3, American Radio Relay League, ISBN: 0-87259-047-X.
"Differential/Cascode Amplifiers", pp. 148, 149, Nov. 1973, Linear Integrated Circuits, Monoloithic Silicon, File No. 382, RCA Solid State Division.
James K. Hardy, *Electronic Communications Technology*, pp. 7-16, 21-23, 286, 376-379, Prentice Hall, 1986.
Paul H. Young, *Electronic Communication Techniques*, Arizona State University, pp. 126-125, 557-560, 598-599, Merrill Publishing Co., 1985, 1990.
Brochure-Yaesu, FT-1000, Direct Digital Synthesis 1990.
"Information and Noise", Section 4, pp. 48-49, Modern Dictionary of Electronics, Sixth Edition, Rudolf F. Graf, Publ. by Sams (ITT) 1984.
"Receiver Design Basics", Chapter 5, pp. 69-81, Solid State Design for the Radio Amateur, 1977.
Brochure-"Performance-Direct Digital Synthesis", 1989, Yaesu, USA ICOM IC-781 160- to 10-Meter Transceiver, Product Review, Jan. 1990, pp. 39-43 and p. 73.
Brochure, "Kenwood New Product Information TS-950S HF Transceiver", Kenwood Corporation, circa 1989, Audio Filter Building Blocks, Bob Witte, Ham Radio, Jul. 1983, pp. 74-78.
"The Weekender Noise Cancellation Circuit", S. J. Defrancesco, Ham Radio, Mar. 1984, pp. 75-76, Instructions of 1-A Audio Filter, Autek Research, 1980.
"Receiving Systems", Chapter 8, pp. 1-11, AARL Handbook for the Radio Amateur, 1983.
"High Frequency Receiver Performance", J. A. Dyer, Ham Radio, Feb. 1984, pp. 33-41.
"Better-sounding SSB", Richard L. Measures, Ham Radio, Feb. 1984, pp. 58-61.

*Primary Examiner*—Curtis Kuntz
*Attorney, Agent, or Firm*—Cushman, Darby & Cushman

[57] ABSTRACT

A radio sensitivity enhancer inputs an incoming radio frequency signal into two receiver strings. The first receiver string modulates the RF signal to a frequency which is passed by a filter to produce the desired signal plus a noise component. In the second receiver string, the RF signal is modulated to a frequency outside the frequencies passed by a filter to produce a signal with a noise component but without the desired signal. The desired signal with the noise component is then subtracted from the signal with only the noise component to produce a substantially noise-free desired signal.

15 Claims, 3 Drawing Sheets 5,134,723

RADIO SENSITIVITY ENHANCER

BACKGROUND OF THE INVENTION

1. Field of the Invention

This invention relates to radio signal receivers. More particularly, this invention relates to improvements in the noise reduction circuitry of a radio receiver.

2. 2. Description of the Related Art

FIG. 4 illustrates the conventional radio receiver. A front end preselect filter 10 accepts a radio frequency signal and passes a preselected band of radio frequency signals to the mixer 12. The mixer 12 mixes the RF signal from the filter 10 with an intermediate frequency supplied by the variable oscillator 14. The intermediate frequency (IF) signal passes through the crystal filter 16 which selects a band of IF frequencies to pass to the IF amplifier 18. The selectivity of the receiver is dependent on the bandpass of the crystal filter 16. After amplification in the IF amplifier 18, the IF signal is translated into an audio frequency by the product detector 20, which mixes the IF signal with a beat frequency signal supplied by the beat frequency oscillator 22. The audio signal from the product detector 20 is amplified by the audio frequency amplifier 24 and input to a speaker 26.

The signal travelling through the circuit of FIG. 4 includes several known forms of noise. Specifically, but not exclusively, the RF signal input to the filter 10 may be subject to atmospheric noise and the signals passing through the electronic elements 10 through 26 may be subject to receiver generated electronic noise. As is well known in the art, the extent of noise in the signal received and processed by the receiver limits the ability of the receiver to detect particular RF signals.

SUMMARY OF THE INVENTION

The radio sensitivity enhancer according to the present invention provides improved reception of RF signals by improved apparatus and methods for reducing the noise component in the desired RF signal. The primary object of the present radio sensitivity enhancer is to remove the unwanted noise component from one or more desired radio signals, whether the noise is atmospheric, electronic, or any other type of noise, without limit.

Another object of the present radio sensitivity enhancer is to provide improved noise reduction in conventional receivers without major alteration requirements.

Another object of the present radio sensitivity enhancer is to enhance the utilization of the radio frequency spectrum in the range of 10 KHz to 22 MHz.

In accordance with these objects, the present radio sensitivity enhancer inputs an RF signal into two independent receiver strings. The first receiver string detects the desired RF signal by detecting all signals within a bandwidth of frequencies including the frequency of the desired signal. The first receiver string thus obtains the desired signal with its undesirable noise component in the conventional manner. The second receiver string accepts the same RF signal as the first receiver string but produces a pure noise signal by detecting frequencies in a bandwidth which does not include the desired signal.

Since the noise component at the desired frequency is the same or similar to the noise component at other frequencies, the signal from the first receiver string will include the desired signal with its noise component and the signal from the second receiver string will include no desired signal yet with substantially the same noise component. By subtracting the signal output by the second receiver string from the signal output by the first receiver string, the noise components will cancel and the desired signal will through the receiver, substantially noisepass free. Likewise, as the second receiver string is tuned to a bandwidth including a second desired signal, then the two desired signals are output and the noise components substantially cancel.

BRIEF DESCRIPTION OF THE DRAWINGS

In accordance with these and other objects which will become apparent, the inventor describes the present invention below with particular reference to the accompanying drawings, in which.

DETAILED DESCRIPTION OF THE PRESENTLY PREFERRED EMBODIMENTS

Figure 1:
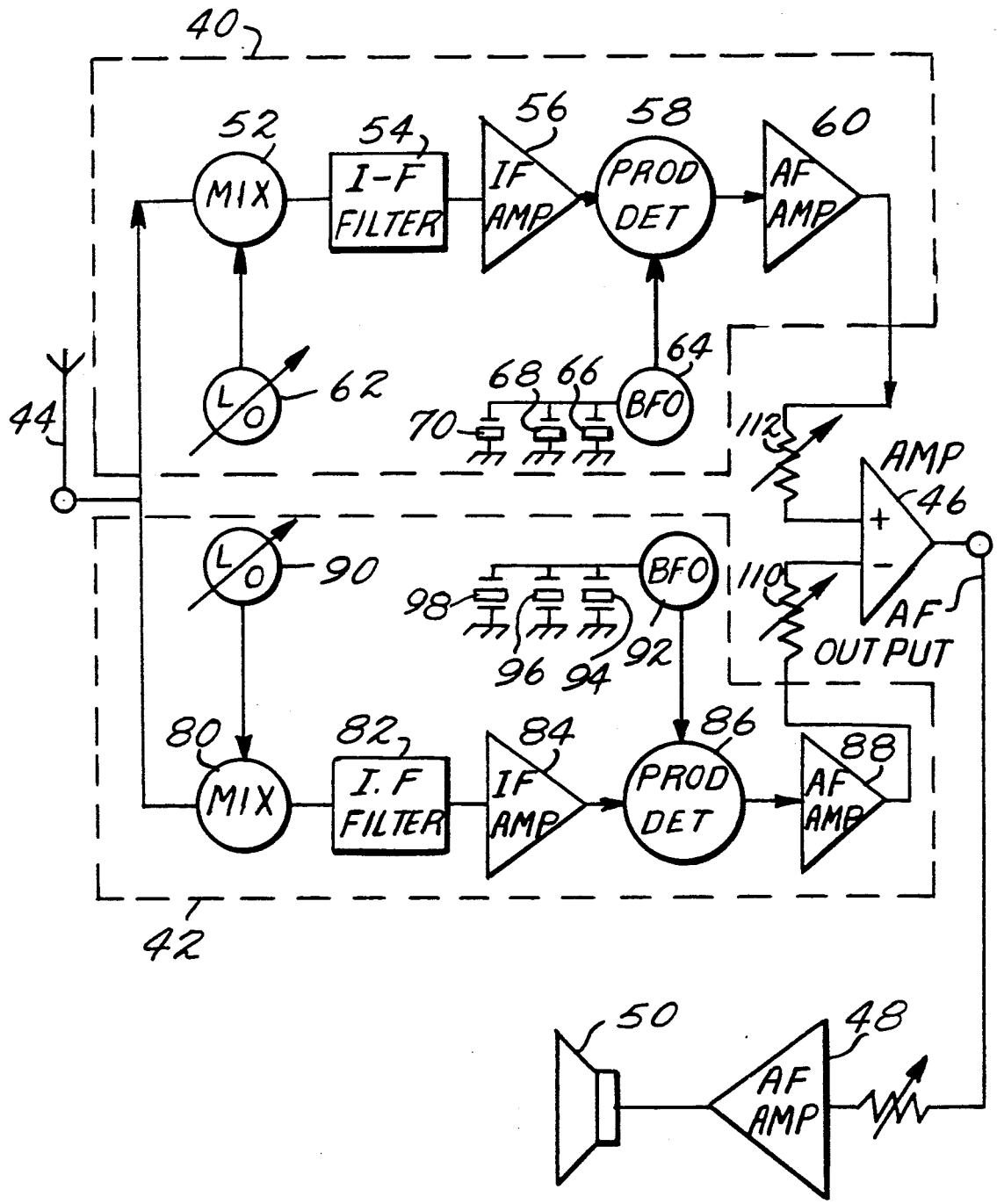
FIG. 1 is a schematic block diagram of a multi-mode radio sensitivity enhancer in accordance with the present invention.

Referring to FIG. 1, the radio sensitivity enhancer includes a first receiver string 40 connected in parallel to a second receiver string 42 by an antenna 44 at the input end and by a differential amplifier 46 at the output end. The output of the differential amplifier 46 is connected to an audio frequency amplifier 48 which in turn is connected to the speaker 50.

The first receiver string 40 includes, in turn, a mixer 52, an intermediate frequency signal filter 54, an intermediate frequency amplifier 56, a product detector 58, and an audio frequency amplifier 60. A variable frequency local oscillator 62 is connected to the mixer 52 and a beat frequency oscillator 64 is connected to the product detector 58. The beat frequency oscillator may be controlled by three or more crystals 66, 68, and 70, which correspond to, for example, three or more modes of reception such as amplitude modulation (AM), continuous wave (CW), and single side band (SSB).

The second receiver string 42 includes a mixer 80, an intermediate frequency signal filter 82, an intermediate frequency amplifier 84, a product detector 86, and an audio frequency amplifier 88. A variable frequency local oscillator 90 is connected to the mixer 80 and a beat frequency oscillator 92 is connected to the product detector 86. The beat frequency oscillator 92 may be controlled by three or more crystals 94, 96, and 98, which may correspond to three or more modes of receiver operation such as AM, CW and SSB.

The output of the audio frequency amplifier 60 of the first receiver string 40 is connected to the positive input of the differential amplifier 46 through a series connection with a balance control resistor 112. Similarly, the audio frequency amplifier 88 of the second receiver string 42 is connected to the inverting input of the differential amplifier 46 through a series connection with a balance control resistor 110. Alternatively, the audio frequency amplifier 60 of the first receiver string may be connected to the inverting input of the differential amplifier 46 if the audio amplifier 88 of the second receiver string 42 is connected to the non-inverting input.

In operation, the antenna 44 receives radio frequency energy from the atmosphere and places a radio frequency signal on the input lines to the first receiver string 40 and the second receiver string 42. Referring first to the operation of the first receiver string 40, the RF signal is input to the mixer 52 which modulates the incoming RF signal with the signal from the variable frequency local oscillator 62 to produce an intermediate frequency signal at the mixer output. Next, an intermediate frequency filter 54 accepts the intermediate frequency signal from the mixer 52 and passes only an intermediate frequency signal in a selected bandwidth of frequencies.

The intermediate frequency filter 54 passes a bandwidth of frequencies, with the width of the bandpass establishing the receiver selectivity. As is known in the art, the characteristics of the intermediate frequency filter (bandwidth and center frequency) will vary depending on whether the operator desires CW, SSB (either Upper Side Band or Lower Side Band) or AM reception. The intermediate frequency filter 54 may include a mode switch which selects the desired intermediate frequency filter characteristics for the desired mode of operation. As a specific example, the intermediate frequency filter 54 may have a bandwidth of about 6 KHz to receive AM voice signals, about three KHz for SSB voice signals, and nominally 500 Hz for CW signals.

In the first receiver string 40, the mixer 52 adds the frequency of the desired signal from the antenna 44 with the frequency of the signal from the local oscillator 62. The local oscillator 62 is tuned so the sum of the frequency of the desired radio frequency signal from the antenna 44 and the frequency from the local oscillator 62 will be passed within the bandwidth selected by the intermediate frequency filter 54. The bandwidth of signals passed by the intermediate frequency filter 54, including the desired signal, are amplified by the intermediate frequency amplifier 56 and input to the product detector 58. The product detector 58 outputs a product or difference frequency of the intermediate frequency signal from the intermediate frequency amplifier 56 and the frequency signal of the beat frequency oscillator 64. By doing so, the product detector 58 converts the intermediate frequency signal from the intermediate frequency amplifier 56 into an audio signal which the product detector 58 outputs to the audio frequency amplifier 60.

Figure 2:
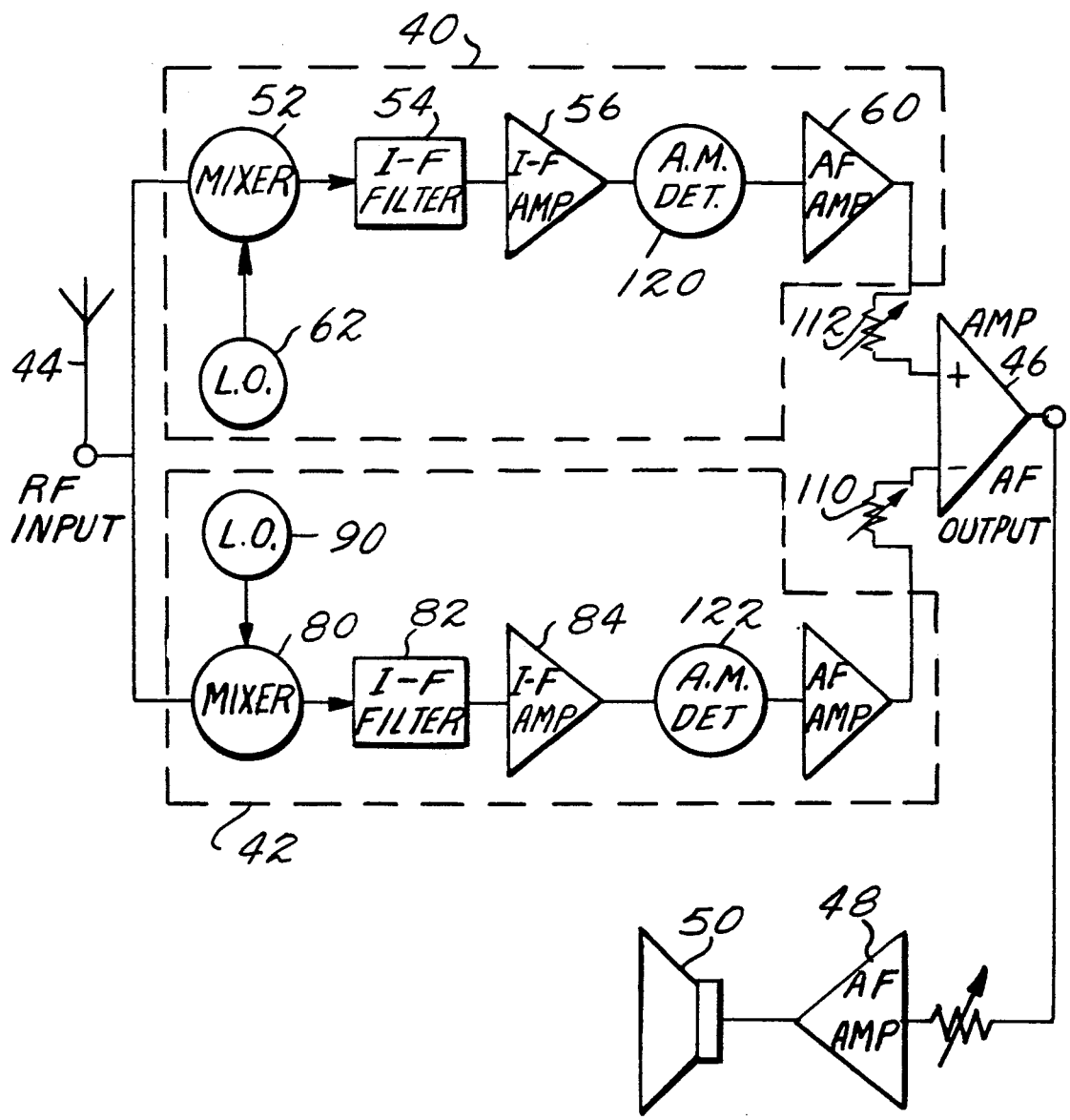
FIG. 2 is a schematic block diagram of an AM mode radio sensitivity enhancer in accordance with the present invention.

The beat frequency oscillator 64 will vary depending on the mode of operation of the receiver circuit. When used during SSB reception, the beat frequency oscillator is offset from the frequency of the desired intermediate frequency signal, to which it provides a carrier frequency. The beat frequency oscillator frequency is offset roughly +1.7 KHz for upper side band voice reception or −1.7 KHz for lower side band voice reception. For CW mode, the beat frequency oscillator does not insert a carrier to the desired intermediate frequency signal, but provides a signal which, when mixed with the desired intermediate frequency signal (in the product detector 58), produces a beat note in the audible frequency range. This beat frequency oscillator frequency is usually selected to provide a beat note frequency of approximately 600 to 800 HZ but may be adjusted according to the user's preference. In FIG. 1, in AM mode, the beat frequency oscillator may be entirely disabled. Then, without the BFO, the receiver detector may include an AM detector 120, as shown in FIG. 2. Referring again to FIG. 1, the operator may alternatively set the BFO frequency to the same frequency as the AM carrier intermediate frequency signal to provide a zero beat frequency.

The BFO 64 in FIG. 1 may be crystal controlled by a selected crystal 66, 68, or 70, depending on the receiver mode selected (SSB, CW or AM), although non-crystal controlled oscillators are also known in the art and may be substituted for the crystals.

Following the product detector 58, the audio frequency amplifier 60 amplifies the audio signal and outputs the amplified audio signal from the first receiver string 40 to the positive input of the differential amplifier 46 through a balance control resistor 112.

The second receiver string 42 operates with similar circuit elements as the first receiver string 40. The RF signal from the antenna 44 is input to the mixer 80 and is mixed with a signal from the local oscillator 90 to produce an intermediate frequency signal which is outside of the bandwidth which is passed by the intermediate frequency filter 82.

The intermediate frequency signal output by the IF filter 82 is amplified in amplifier 84 and mixed in the product detector 86 with a signal from the BFO 92 to produce an audio frequency signal. The audio frequency signal is amplified in the audio frequency amplifier 88 and is input to the inverting input of the differential amplifier 46 through a balance control resistor 110. Optionally, the respective audio signals output by the first and second receiver strings may be reversed at the differential amplifier 46, with the audio signal from the first receiver string 40 being input to the inverting input of the differential amplifier 46 and the audio signal from the second receiver string 42 being input to the non-inverting input of the differential amplifier.

Figure 3:
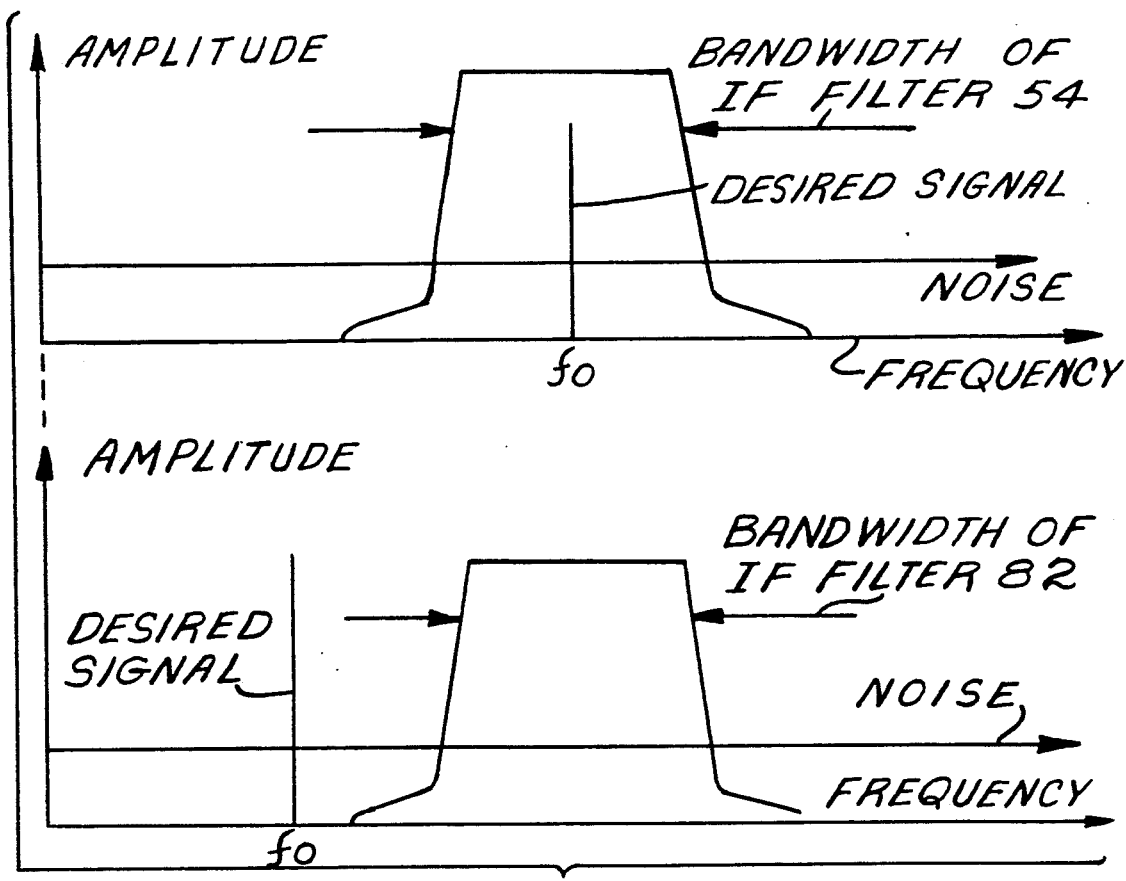
FIG. 3 is a frequency diagram illustrating the bandpass characteristics of one embodiment of the present invention.
Figure 4:
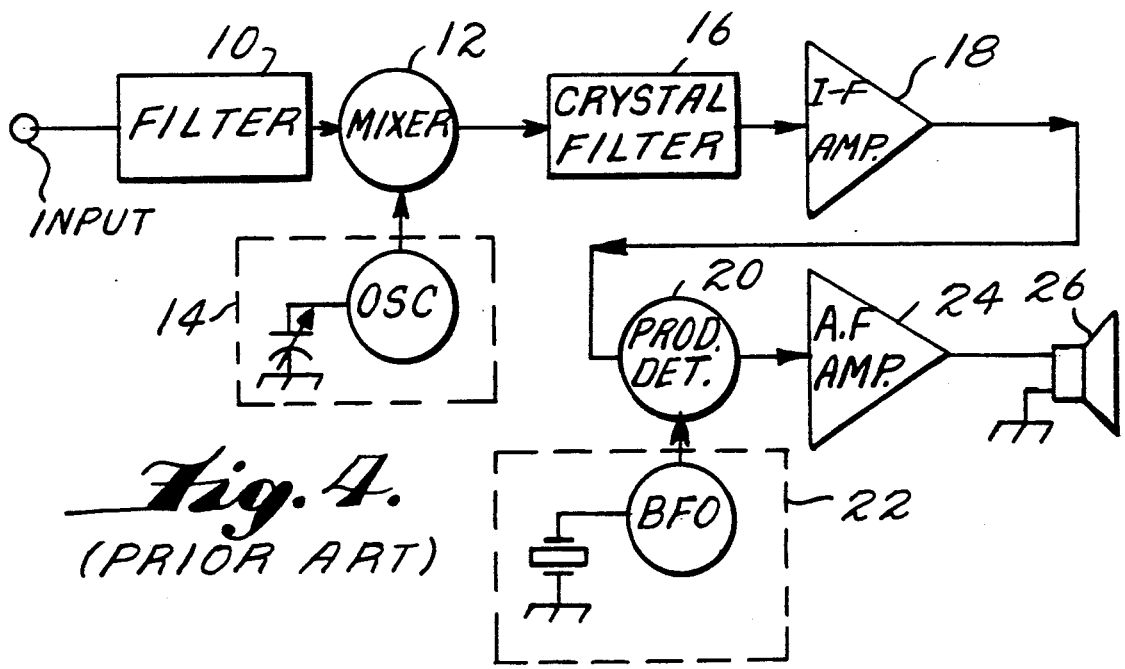
FIG. 4 is a schematic block diagram of the conventional radio receiver.

FIG. 3 illustrates the frequency response curves for the first receiver string 40 (upper curve) and the second receiver string 42 (lower curve). In each frequency response curve, the bandwidth of the intermediate frequency filters 54 and 82 are shown along with the noise signal and the frequency $f_0$ of the signal output by the respective mixers 52 and 80. In the upper frequency response curve (corresponding to the first receiver string 40), the mixer 52 mixes a signal from the local oscillator 62 with the RF signal from the antenna 44 such that the frequency $f_0$ lies within the bandwidth of the intermediate frequency filter 54.

On the other hand, in the lower frequency response curve (corresponding to the second receiver string 42), the mixer 80 mixes a signal from the local oscillator 90 with the incoming RF signal such that the frequency $f_0$ of the intermediate frequency signal output by the mixer 80 lies outside of the bandwidth which will be passed by the intermediate frequency filter 82. Note that in both cases, the frequency of the RF signal remains constant. In addition, the bandwidth of the respective IF filters 54 and 82 may also remain constant, with the local oscillators 62 and 90 providing the necessary variable to move the signal at the frequency $f_0$ within or without the bandwidth of the respective intermediate frequency filters 54 and 82.

As particularly illustrated in FIG. 3, the noise component within the bandwidth of the intermediate frequency filter 54 and within the bandwidth of the intermediate frequency filter 82 is substantially identical. That noise component which is identical will include noise caused by outside sources such as atmospheric noise, man-made noise, extraterrestrial noise, and noise generated by electronics common to both receiver strings. Accordingly, when the respective signals within the bandwidths shown in FIG. 3 are converted to audio signals and the signal passed by the bandwidth of the IF filter 82 is subtracted from the signal passed by the bandwidth of the IF filter 54, the respective noise components will cancel, leaving the desired audio signal substantially noise-free. For this, the differential amplifier 46 supplies the subtraction operation, with the audio signal corresponding to the upper response curve in FIG. 3 being input to the non-inverting input of the differential amplifier and the signal corresponding to the lower response curve in FIG. 3 being input to the inverting input of the differential amplifier 46.

The substantially noise-free output of the differential amplifier 46 is amplified by the amplifier 48 and input to a speaker 50 or any other known output device. Supplementally, the operator may use the balance controls 110 and 112 to adjust the respective signals from the first receiver string 40 and the second receiver string so the respective noise levels output by each string have substantially identical amplitude when they are input to the differential amplifier 46.

AM Mode Receiver

As briefly described above, FIG. 2 is a receiver similar to the receiver of FIG. 1, yet limited to AM mode reception. The only substantial differences between the receiver of FIG. 2 and the receiver of FIG. 1 is the lack of mode selection in the IF filters 54 and 82 (the IF filters are preset to an AM bandpass) and the replacement of the product detector/BFO components with AM detectors 120 and 122. Like the receiver in FIG. 1, the first receiver string 40 in FIG. 2 generates a desired signal with a noise component and the second receiver string 42 generates a signal solely with a noise component and no desired signal.

In FIG. 2, the frequency of the local oscillator 90 is crystal controlled (but may be a non-crystal controlled oscillator) and set at a frequency band edge, for example, approximately 610 KHz for the broadcast band, or where no radio stations transmit yet where the noise component is present. The user can then tune AM radio stations with the second local oscillator 62 to receive a desired signal plus a noise component while maintaining the noise signal nulling ability using the differential amplifier 46 and the pure noise component from the second receiver string 42.

Of course, the AM mode receiver of FIG. 2 is not limited to operation in the broadcast band, but may operate at any frequency in the radio frequency spectrum.

SSB Example

The present invention is not limited to any particular mode of operation nor any particular frequencies of operation, however, one particular method of operating the radio sensitivity enhancer follows. In FIG. 1, the antenna 44 detects and transmits radio frequency signals in the frequency range of 3.5 to 4.0 MHz into the first receiver string 40 and the second receiver string 42. In the first receiver string 40, the 3.5 to 4.0 MHz radio signal is mixed in the mixer 52 with a 5.0 to 5.5 MHz signal from the local oscillator 62 such that the resultant intermediate frequency signal is in the immediate vicinity of 9 MHz, such as 9 MHz±several KHz. The intermediate frequency filter 54 passes frequencies only in the immediate vicinity of 9 MHz, thus passing the intermediate frequency signal generated by the mixer 52. The intermediate frequency amplifier 56 amplifies the 9 MHz intermediate frequency signal and the product detector 58 converts the signal to an audio frequency. The audio frequency signal is amplified in the amplifier 60 and input to the differential amplifier 46 at its non-inverting terminal.

In the meantime, the mixer 80 receives the 3.5 to 4.0 MHz radio frequency signal and mixes the radio frequency signal with a 5.0 to 5.5 MHz signal generated by the local oscillator 90 to produce the same desired signal outside the bandwidth of the 9 MHz bandpass intermediate frequency filter 82. The intermediate frequency filter 82 thus passes only a noise component, without the desired signal, which is amplified by the intermediate frequency amplifier 84 and converted to an audio signal by the product detector 86. The noise component, as converted to audio frequency, is input to the inverting terminal of the differential amplifier 46 where it is subtracted from the signal input to the non-inverting terminal of the differential amplifier 46 to produce a substantially noise-free desired signal. The differential amplifier 46 outputs the substantially noise-free desired signal to the amplifier 48 which amplifies the signal to an adequate power of, for example, 0.5 to 5 watts for an 8 ohm voice speaker 50.

First Alternative Embodiment

An alternative embodiment of the present invention, which is equally applicable to any mode of operation, involves moving the bandwidth of the filters 54 and 82, rather than moving the frequency $f_0$ of the signal output by the mixers 52 and 80. In this embodiment, both mixers 52 and 80 may output an IF signal at substantially the same frequency. Then, IF filter 54 of the first receiver string 40 is chosen with a bandwidth which passes the frequency $f_0$ of the signal output by the mixer 52 while the IF filter 82 of the second receiver string 42 is chosen with a bandwidth which will not pass the frequency $f_0$ of the signal output by the mixer 80. In like result as the first embodiment, the first receiver string 40 will pass the desired signal plus a noise component and the second receiver string 42 will pass only the noise component.

Other modifications of the filters 54/82 and mixers 52/80 may be used provided the first receiver string is tuned to pass the desired signal with a noise component and the second receiver string is tuned to pass a noise component.

Second Alternative Embodiment

In another embodiment, the receiver of FIG. 1 may be used to receive two simultaneous RF signals and simultaneously produce both signals substantially noise-free at the output of the differential amplifier 46. Since each of the two signals processed by the first receiver string 40 and second receiver string 42, respectively, include a substantially identical noise component, when the two signals pass through the differential amplifier 46, the noise components will be cancelled, leaving both desired signals at the output of the amplifier 46. With this arrangement, for example, two desired radio frequencies having two respective radio signals may be input to the first receiver string 40 and the second receiver string 42, with the first local oscillator 62 tuning the first string 40 to one desired radio frequency and the second local oscillator 90 tuning the second string 42 to the second desired frequency. Each respective radio signal will then be converted to audio and passed through the differential amplifier 46, with the signal from the first receiver string 40 passing through the non-inverting input and the signal from the second receiver string 42 passing through the inverting input of the differential amplifier 46.

From the differential amplifier 46, the desired radio signals from the first and second receiver strings 40 and 42 will pass through the differential amplifier 46 unchanged (except for a possible 180° phase shift), yet the noise signals in each of the radio signals passing through the respective receiver circuits will cancel out, to simultaneously produce the two desired radio signals on the output of the differential amplifier 46 substantially noise-free.

With the improved radio sensitivity enhancer of the several embodiments described above, unwanted noise present in a desired signal may be removed without thresholding circuitry and without artificially generated noise components. Since the noise reduction is so substantially improved over prior noise reducers, the present radio sensitivity enhancer may find particular use at any frequency in the usable radio frequency spectrum, and particularly at frequencies between 10 KHz and 22 MHz which are most sensitive to noise.

Also of particular interest when comparing the presently improved radio sensitivity enhancer over prior noise reducers, the present radio sensitivity enhancer may be used with conventional receiver components with no major alteration requirements. Further, the radio sensitivity enhancer produces no gaussian component on the audio signal output by the receiver such as may be created by prior noise reduction devices which artificially produce a noise signal. Finally, no receiver signal delays or phase shifts are present in the present radio sensitivity enhancer which may be caused by dissimilar processing units in prior noise reduction circuits.

While the inventor has described the invention in what the inventor considers the most practical and preferred embodiments, the inventor does not limit the invention to the embodiments described but intends the invention to cover various modifications and equivalent arrangements within the spirit and scope of the appended claims.

What is claimed is:

1. A radio sensitivity enhancer, comprising:
   means for receiving a desired signal at a desired signal frequency, the desired signal being subject to an outside source noise component at a range of noise component frequencies including the desired signal frequency;
   first filter means, connected to the receiving means, for passing the desired frequency, thereby passing the desired signal together with the outside source noise component, and outputting the desired signal together with the outside source noise component;
   second filter means, connected to the receiving means, for passing a frequency in the range of noise component frequencies other than the desired frequency, thereby passing the outside source noise component, without the desired signal, and outputting the outside source noise component,
   the outside source noise component being from sources other than circuitry internal to the first and second filter means; and
   means for subtracting the output of the second filter means from the output of the first filter means to obtain a desired signal substantially free of the outside source noise component.

2. A radio sensitivity enhancer according to claim 1, wherein:
   the first filter means includes a first bandpass filter characterized by a first bandwidth, the first bandwidth including the desired frequency, and
   the second filter means includes a second bandpass filter characterized by a second bandwidth, different from the first bandwidth, the second bandwidth including the frequency in the range of noise component frequencies but not including the desired frequency.

3. A radio sensitivity enhancer according to claim 1, further including:
   means for receiving the desired signal at an RF signal frequency; and
   modulator means for converting the desired signal at the RF signal frequency into the desired signal at the desired frequency, the first filter means having a first bandpass filter characterized by a first bandwidth including the desired frequency and the second filter means having a second bandpass filter characterized by a second bandwidth not including the desired frequency.

4. A radio sensitivity enhancer according to claim 1, further including:
   an antenna to receive the desired signal at an RF signal frequency;
   the first filter means including a bandpass filter capable of passing a bandwidth of frequencies and a first mixer, connected between the antenna and the bandpass filter, to modulate the desired signal from the RF frequency to a first frequency within the bandwidth of frequencies, and
   the second filter means including the bandpass filter and a second mixer, connected between the antenna and the bandpass filter, to modulate the desired signal from the RF frequency to a second frequency outside the bandwidth of frequencies.

5. A radio sensitivity enhancer according to claim 1, further including:
   an antenna to receive the desired signal at an RF signal frequency;
   the first filter means including a first bandpass filter capable of passing a first bandwidth of frequencies and a first mixer, connected between the antenna and the first bandpass filter, to modulate the desired signal to a first frequency within the first bandwidth of frequencies, and
   the second filter means including a second bandpass filter capable of passing a second bandwidth of frequencies and a second mixer, connected between the antenna and the second bandpass filter, to modulate the desired signal to a second frequency outside the second bandwidth of frequencies.

6. A radio sensitivity enhancer according to claim 1, further including:
   an antenna to receive the desired signal at an RF signal frequency;
   the first filter means including a first bandpass filter capable of passing a first bandwidth of frequencies and a mixer, connected between the antenna and the first bandpass filter, to modulate the desired signal to a first frequency within the first bandwidth of frequencies, and the second filter means including a second bandpass filter capable of passing a second bandwidth of frequencies and the mixer, connected between the antenna and the second bandpass filter, to modulate the desired signal to a second frequency outside the second bandwidth of frequencies.

7. A radio sensitivity enhancer, comprising:

means for receiving a first desired signal at a first desired frequency and a second desired signal at a second desired frequency, both desired signals being subject to an outside source noise component at a range of noise component frequencies including the first and second desired frequencies;

first filter means, connected to the receiving means, for passing the first desired frequency but not the second desired frequency, thereby passing the first desired signal together with the outside source noise component, and outputting the first desired signal together with the outside source noise component;

second filter means, connected to the receiving means, for passing the second desired frequency but not the first desired frequency, thereby passing the second desired signal together with the outside source noise component, and outputting the second desired signal together with the outside source noise component, the outside source noise component being from sources other than circuitry internal to the first and second filter means; and means for subtracting the output of the second filter means from the output of the first filter means to obtain a first desired signal substantially free of the outside source noise component and a second desired signal substantially free of the outside source noise component.

8. A radio sensitivity enhancer according to claim 6, wherein:

the first filter means includes a first bandpass filter characterized by a first bandwidth, the first bandwidth including the first desired frequency but not including the second desired frequency, and the second filter means includes a second bandpass filter characterized by a second bandwidth, different from the first bandwidth, the second bandwidth including the second desired frequency but not including the first desired frequency.

9. A radio sensitivity enhancer according to claim 6, further including:

means for receiving the first and second desired signals at first and second RF signal frequencies, respectively; and modulator means for converting the first desired signal at the first RF signal frequency to the first desired signal at the first desired frequency and for converting the second desired signal at the second RF signal frequency to the second desired signal at the second desired frequency, the first filter means having a first bandpass filter characterized by a first bandwidth including the first desired frequency but outside of the second desired frequency and the second filter means having a second bandpass filter characterized by a second bandwidth including the second desired frequency but outside of the first desired frequency.

10. A radio sensitivity enhancer according to claim 6, further including:

an antenna to receive the desired signal at an RF signal frequency;

the first filter means including a first bandpass filter capable of passing a first bandwidth of frequencies and a first mixer, connected between the antenna and the first bandpass filter, to modulate the first desired signal to a first frequency within the first bandwidth of frequencies but outside the second bandwidth of frequencies, and the second filter means including a second bandpass filter capable of passing a second bandwidth of frequencies and a second mixer, connected between the antenna and the second bandpass filter, to modulate the second desired signal to a second frequency within the second bandwidth of frequencies but outside the first bandwidth of frequencies.

11. A radio sensitivity enhancer according to claim 7, further including:

an antenna to receive the desired signal at an RF signal frequency;

the first filter means including a first bandpass filter capable of passing a first bandwidth of frequencies and a mixer, connected between the antenna and the first bandpass filter, to modulate the first desired signal to a first frequency within the first bandwidth of frequencies, and the second filter means including a second bandpass filter capable of passing a second bandwidth of frequencies and the mixer, connected between the antenna and the second bandpass filter, to modulate the second desired signal to a second frequency within the second bandwidth of frequencies.

12. A method of generating a radio signal, comprising the steps of:

receiving a desired signal at a desired frequency together with an outside source noise component at a range of frequencies including the desired frequency;

tuning a first receiver string to the desired frequency and outputting the desired signal and the outside source noise component;

tuning a second receiver string to a frequency other than the desired frequency yet within the range of frequencies of the outside source noise component and outputting the outside source noise component without the desired signal, the outside source noise component being from sources other than circuitry internal to the first and second receiver strings; and subtracting the output of the first receiver string from the output of the second receiver string and outputting the desired signal substantially free of the outside source noise component.

13. A method according to claim 12, wherein the step of tuning the first receiver includes the steps of:

modulating the desired signal to the desired frequency and passing the modulated signal through a bandpass filter having a bandwidth including the desired frequency.

14. A method according to claim 13, wherein the step of tuning the second receiver includes the steps of:

modulating the desired signal to the frequency other than the desired frequency and passing the outside source noise component at the desired frequency through a bandpass filter having a bandwidth including the desired frequency but not including the frequency other than the desired frequency.

15. A method according to claim 12, wherein:

the step of receiving includes:

receiving a first desired signal at a first desired frequency together with the outside source noise component and receiving a second desired signal at a second desired signal frequency together with the outside source noise component;

the step of tuning the first receiver string includes:

tuning the first receiver string to the first desired frequency and outputting the first desired signal and the outside source noise component;

the step of tuning the second receiver string includes:

tuning the second receiver string to the second desired frequency and outputting the second desired signal and the outside source noise component; and the step of subtracting includes:

outputting the first and second desired signals substantially free of the outside source noise component.

* * * * *